US007053958B2

(12) United States Patent
Collins et al.

(10) Patent No.: US 7,053,958 B2
(45) Date of Patent: May 30, 2006

(54) METHOD AND APPARATUS FOR PROVIDING BINARY DIGITAL TV DATA FROM A STRUCTURED DATA FORMAT

(75) Inventors: Andrew Collins, Basingstoke (GB); Mark Dobie, Southampton (GB); Pranay Sharma, Walton-on-Thames (GB)

(73) Assignee: Sony United Kingdom Limited, Weybridge (GB)

( * ) Notice: Subject to any disclaimer, the term of this patent is extended or adjusted under 35 U.S.C. 154(b) by 499 days.

(21) Appl. No.: 10/356,103

(22) Filed: Jan. 31, 2003

(65) Prior Publication Data

US 2003/0179315 A1    Sep. 25, 2003

(30) Foreign Application Priority Data

Feb. 1, 2002    (GB) .................................. 0202414.9

(51) Int. Cl.
*H03M 1/12* (2006.01)
*H04N 7/01* (2006.01)

(52) U.S. Cl. ...................................... 348/573; 348/441
(58) Field of Classification Search ................ 348/572, 348/573, 461, 441; 341/155, 126; H04N 7/01, H04N 11/20
See application file for complete search history.

(56) References Cited

U.S. PATENT DOCUMENTS 6,297,851 B1 * 10/2001 Taubman et al. ........... 348/572

FOREIGN PATENT DOCUMENTS

| EP | 1 122 652 | 8/2001 |
| EP | 1 148 432 | 10/2001 |
| WO | WO 01/98948 | 12/2001 |

* cited by examiner

*Primary Examiner*—Sherrie Hsia
(74) *Attorney, Agent, or Firm*—Oblon, Spivak, McClelland, Maier & Neustadt, P.C.

(57) ABSTRACT

A method and apparatus for providing binary digital TV data from a structured data format, wherein data in a structured data format according to a predetermined intermediate data format definition is converted into binary digital TV data of a predetermined technical standard, a conversion algorithm being applied to a structured data format according to a user data format definition so as to convert the data in the structured data format according to the user data format definition to data in the structured data format according to said intermediate data format definition for conversion into the binary digital TV data.

28 Claims, 1 Drawing Sheet

METHOD AND APPARATUS FOR PROVIDING BINARY DIGITAL TV DATA FROM A STRUCTURED DATA FORMAT

BACKGROUND OF THE INVENTION

1. Field of the Invention

The present invention relates to a method and apparatus for providing binary digital TV data from a structured data format, in particular a method and apparatus allowing descriptor tables for digital TV data to be taken account of whilst users to define data in semantics.

2. Description of the Related Art

Various systems, each having its own technical standards, are known for transmitting digital television data, for instance DVB, ATSC and ARIB.

Most of these available systems make use of the MPEG-2 technical standards for packetizing the data. The format of the data, for instance which bits signify what information, is defined in the technical standards by way of descriptor tables. For instance, for DVB, these are found in DVB Document A038. However, as new and different features are developed for these systems, additional descriptor tables are published.

In the broadcast industry, individuals who develop and make use of new broadcast features are generally not familiar with details of the required binary format. Indeed, irrespective, it is a considerable burden on those individuals to fully understand and implement the precise binary formats defined by the descriptor tables. This is particularly true when new features and descriptor tables become available and there is a rush to make use of these features.

OBJECTS OF THE INVENTION

It is an object of the present invention to facilitate construction of binary digital TV data, in particular with regard to descriptor tables.

SUMMARY OF THE INVENTION

According to the present invention, there is provided a method of describing binary digital TV data including describing binary digital TV data in accordance with a predetermined technical standard with structured data format according to an intermediate data format definition such that a predetermined algorithm may be used to convert data in the structured data format according to said intermediate data format definition into binary digital TV data of said predetermined technical standard, a user defining digital TV data with a structured data format according to a user data format definition, the user data format definition and a conversion algorithm for converting data in the structured data format according to the user data format definition into data in the structured data format according to said intermediate data format definition being defined according to descriptor tables of the predetermined technical standard.

According to the present invention, there is also provided an intermediate data format definition defining a structured data format for describing digital TV data in accordance with a predetermined standard such that a predetermined technical algorithm may be used to convert data in the structured data format according to said intermediate data format definition into binary digital TV data of said predetermined technical standard whereby user data format definitions and conversion algorithms may be devised according to descriptor tables for the predetermined technical standard, the user describing data with the structured data format according to a user data format definition and data in the structured data format according to the user data format definition being converted by the conversion algorithm to structured data format according to said intermediate data format definition.

In this way, a close representation of the binary data is provided in a structured data format in a predetermined format which can automatically be converted into the binary data. The intermediate structured data format definition provides all the necessary data to allow direct conversion to a binary data format and is applicable to data arranged according to any descriptor table.

The intermediate data format definition could also be used in other situations where binary data is required and is not limited to TV data.

A particular advantage of the intermediate data format is an ability to represent the sizes of binary data sections, these being calculated with the conversion algorithms.

By virtue of the intermediate structured data format layer, it is possible for users to define features for digital TV data in a high level structured data format layer in terms of straightforward semantics. The intermediate structured data format layer allows relatively easy conversion from the user structured data format to the intermediate structured data format.

Hence, according to the present invention, there is provided a method of providing binary digital TV data from a structured data format, the method including providing an intermediate data format definition for structured data format representing digital TV data in accordance with a predetermined technical standard, providing a predetermined algorithm for converting data in the structured data format according to said intermediate data format definition into binary digital TV data of said predetermined technical standard and providing a user data format definition and a conversion algorithm in accordance with descriptor tables for said predetermined technical standard such that features of the digital TV data defined in the structured data format according to said user data format definition are converted by said conversion algorithm into data in the structured data format according to said intermediate structured data format definition.

According to the present invention, there is also provided an apparatus for providing binary digital TV data from a structured data format, the apparatus including a convertor for converting data in a structured data format according to a predetermined intermediate data format definition into binary digital TV data in accordance with a predetermined technical standard an output for outputting the binary digital TV data and a processor for applying a conversion algorithm to a structured data format according to a user data format definition so as to convert the data in the structured data format according to the user data format definition to data in the structured data format according to said intermediate data format definition for conversion by said convertor.

Thus, users in the broadcast industry are able to define the required digital TV data in a semantic form by means of the user structured data format and, when new descriptor tables are published, only the conversion algorithm need be replaced or edited in order to allow complete conversion into binary data.

Preferably, the user data format definition and conversion algorithm are edited/replaced according to descriptor tables of the predetermined standard.

As explained above, this enables conversion to be arranged relatively easily for new descriptor tables.

Preferably, an intermediate memory is provided for the data in the structured data format according to the intermediate data format definition wherein the data in the structured data format according to the intermediate data format definition may be input directly to the intermediate memory.

In this case, operators may additionally create the required digital TV data without using the user structured data format layer. In particular, the digital TV data may be created and described in any desired form and then converted to structured data format according to the intermediate data format definition for subsequent conversion to binary data.

Preferably, an algorithm memory is provided for storing the conversion algorithm wherein the conversion algorithm may be replaced/edited according to descriptor tables for the predetermined standard.

In this way, whenever new descriptor tables are published for the predetermined standard, appropriate conversion algorithms may be devised and provided to the user.

Preferably, a user memory is provided for storing data in the structured data format according to the user data format definition.

The processor may allow creation by a user of data in the structured data format according to the user data format definition.

Thus, user structured data format may be created, edited and stored in the user memory for subsequent conversion.

Preferably, a GUI is provided by which operation of the processor may be controlled.

Thus, input, output and conversion of data may be controlled and, where appropriate, user structured data format may be created and stored.

Preferably, the user data format definition may be replaced/edited according to descriptor tables for the predetermined standard.

The conversion algorithm may be changed accordingly.

The digital TV data is non executable. In other words, the present invention does not relate to compilation of data as conducted for computer programs.

Thus, the digital TV data is preferably service information.

The predetermined standard under which the digital TV data is constructed may be MPEG-2 with the binary data being "inserted" into the MPEG-2 stream format.

The predetermined standard under which the digital TV data is constructed may be one of DVB, ATSC and ARIB. Of course, with appropriate algorithms, the intermediate structured data format could be converted to binary data of other standards.

It will be noted that the intermediate data format definition defines a binary description format/language and the structured data format is preferably XML.

The conversion algorithm may be conducted using any suitable language, but it is preferred to use XSL, since this is particularly advantageous in converting between XML.

An XSL stylesheet may be defined for the processor/algorithm for converting to the binary data.

It will be appreciated that the various definitions/schemas and algorithms can be embodied as code components and these can be stored on a computer readable storage medium. Similarly, the overall systems of creating structured data format data and converting the structured data format data can also be embodied as code components executable on a computer.

DETAILED DESCRIPTION OF THE PREFERRED EMBODIMENTS

Figure 1:
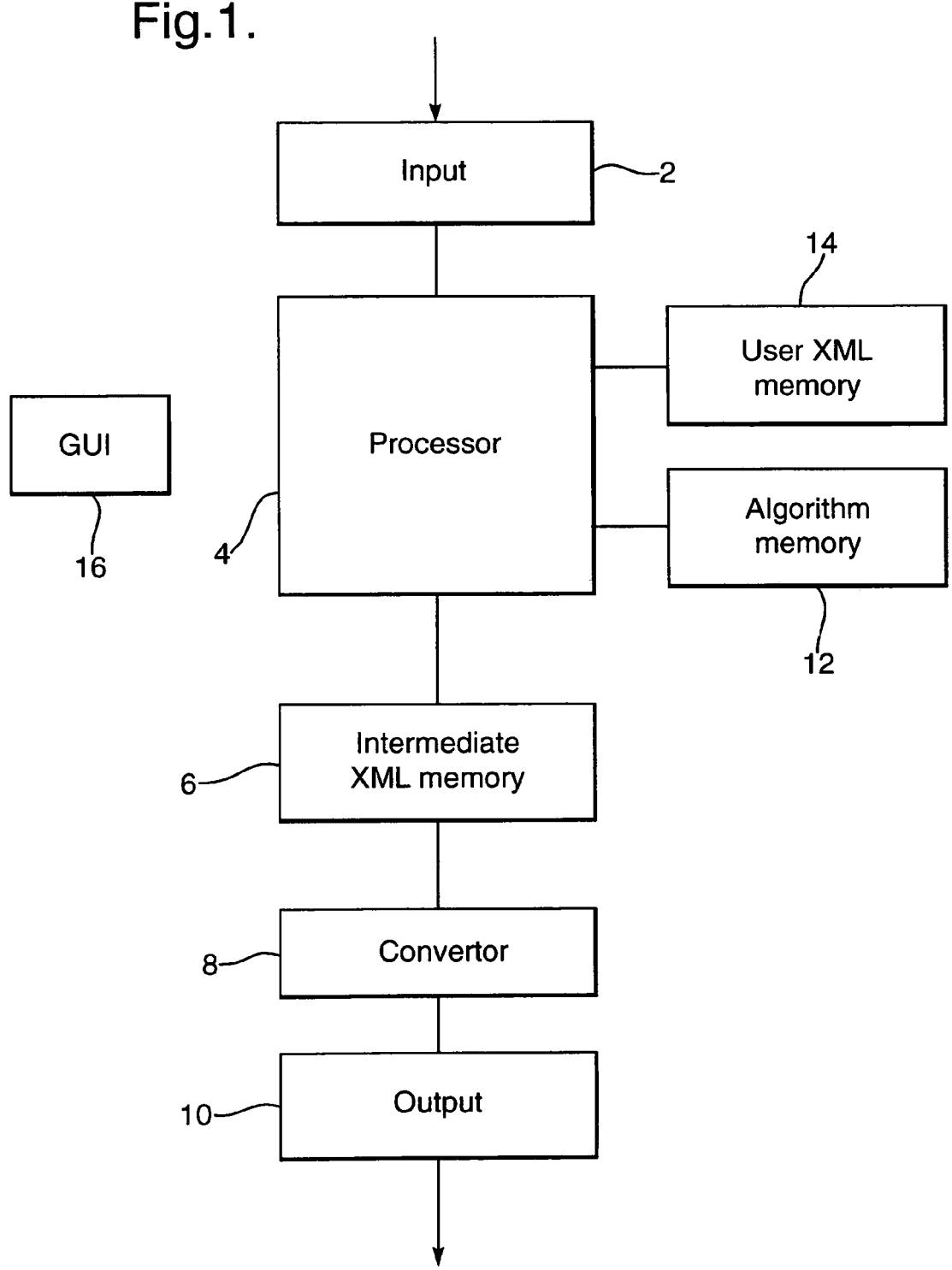
FIG. 1 illustrates schematically parts of a system for providing binary digital TV data.

The invention will be more clearly understood from the following description, given by way of example only, with reference to the accompanying drawing.

When creating digital TV data, for instance service information for systems such as DVB, it is necessary for the data to be arranged in a predefined binary file format. The required binary format is defined for digital TV standards by way of descriptor tables. Thus, for a predetermined standard, there will be a number of descriptor tables.

When developments are made to a particular broadcasting system, the standards may be expanded to include additional descriptor tables.

When a broadcaster is creating data for transmission, it is necessary that this data be created with an appropriate syntax and produced in the required binary format.

Previously, there has been considerable burden on the broadcaster to produce data in the required binary format and the present invention provides a concept by which to reduce the development effort for the generation of binary tables and other section based data by introducing a common intermediate structured data format, for instance an intermediate XML format.

Referring to FIG. 1, user XML provided at input 2 is converted by means of processor 4 into intermediate XML which meets the criteria of an intermediate XML schema. The use of this intermediate XML format forms the basis of the present invention.

The intermediate XML format and the intermediate XML schema defining it are predefined and provide definitions closely based on the binary formats required for output. Since the intermediate XML format is predefined, it is also possible to provide a predetermined algorithm for converting any XML in that format into a binary file.

Referring to FIG. 1, intermediate XML, according to the intermediate XML schema, may be stored in intermediate memory 6. A convertor 8 is then provided for converting the intermediate XML into binary data having the format as defined within the intermediate XML. The binary data is provided from output 10.

It should be appreciated that the intermediate XML format is a general representation of the binary file format and, in itself, does not define aspects of the binary file format required by the descriptor tables. In this respect, the conversion from the user XML to the intermediate XML is arranged to ensure that the intermediate XML contains all of the necessary formatting information such that conversion from the intermediate XML to binary data by the predetermined algorithm results in binary data having the required format.

In order to achieve the above, the processor 4 conducts conversion of user XML to intermediate XML by means of a conversion algorithm which may be replaced or edited.

In the schematic example of FIG. 1, a memory 12 is provided for storing a suitable conversion algorithm. This conversion algorithm is applied to user XML so as to create intermediate XML conforming to the intermediate XML schema (such that it can be converted automatically to binary data).

Whenever new descriptor tables are provided for a particular digital broadcast standard, it is then necessary only to replace or edit the conversion algorithm used to convert the user XML to the intermediate XML. The new conversion algorithm will include features to ensure that the intermediate XML defines the digital TV data in such a manner that, upon automatic conversion to binary data, the binary data will have a format as required by the new descriptor tables.

Of course, the user XML will have to conform to a user XML schema and, in practice, when new descriptor tables are provided it will also be necessary to provide new XML schemas for the user XML.

User XML conforming to the user XML schema may be input and directly converted to intermediate XML by the processor 4. However, the illustrated embodiment allows the inputted user XML to be edited or, indeed, for new user XML to be created. In this respect, a user XML memory 14 is provided for storing user XML and a GUI 16 is provided for controlling operation of the processor 4. The GUI 16 may of course be used to control all other aspects of the system.

By means of the GUI 16, user XML is edited or created according to the user XML schema. The user XML may then be converted as explained above.

In some circumstances, other systems may be provided to create intermediate XML conforming to the intermediate XML schema. In these cases, it would also be possible for the intermediate XML to be provided directly to the intermediate XML memory for conversion to binary data.

In order to ensure that user XML inputted to or created by the apparatus conforms to the user XML schema, the user XML schema may be stored in memory such that appropriate checks may be performed. Similarly, the intermediate XML schema may be stored in memory so as to ensure that XML provided for conversion to binary data does conform to the intermediate XML schema.

The following is an example of an intermediate XML schema.

```
<?xml version="1.0" encoding="UTF-8"?>
<xsd:schema
xmlns:xsd="http://www.w3.org/2000/10/XMLSchema">
    <xsd:annotation>
        <xsd:documentation xml : lang="en">
```

XML Binary Description
Copyright 2000 Sony BPE. All rights reserved.

```
        </xsd:documentation>
    </xsd:annotation>
<xsd:element name="xbd" type="xbd"/>
<xsd:element name="comment" type="xsd:string"/>
<xsd:complexType name="xbd">
    <xsd:sequence>
        <xsd:element name="file" type="file"/>
    </xsd:sequence>
</xsd:complexType>
<xsd:complexType name="node">
    <xsd choice minOccurs="0" maxOccurs="unbounded">
        <xsd:element name="data8" type="data8"/>
        <xsd:element name="data16" type="data16"/>
        <xsd:element name="data32" type="data32"/>
        <xsd:element name="text" type="xsd:string"/>
        <xsd:element name="size8" type="size8"/>
        <xsd:element name="size16" type="size16"/>
        <xsd:element name="size32" type="size32"/>
        <xsd:element name="string255" type="string255"/>
        <xsd:element name="packet" type="packet"/>
        </xsd:choice>
</xsd:complexType>
```

-continued

```
<xsd:complexType name="file">
    <xsd:complexContent>
        <xsd:extension base="node">
            <xsd:attribute name="name" type="string"/>
        </xsd:extension>
    </xsd:complexContent>
</xsd:complexType>
<xsd:complexType name="size8">
    <xsd:complexContent>
        <xsd:extension base="node">
            <xsd:attribute name="value" type="value8"/>
            <xsd:attribute name="mask" type="value8"/>
        </xsd:extension>
    </xsd:complexContent>
</xsd:complexType>
<xsd:complexType name="size16">
    <xsd:complexContent>
        <xsd:extension base="node">
            <xsd:attribute name="value" type="value16"/>
            <xsd:attribute name="mask" type="value16"/>
        </xsd:extension>
    </xsd:complexContent>
</xsd:complexType>
<xsd:complexType name="size32">
    <xsd:complexContent>
        <xsd:extension base="node">
            <xsd:attribute name="value" type="value32"/>
            <xsd:attribute name="mask" type="value32"/>
        </xsd:extension>
    </xsd:complexContent>
</xsd:complexType>
<xsd:complexType name="packets">
    <xsd:sequence>
        <xsd:element name="header" type="packetnode"/>
        <xsd:element name="payload" type="payload"/>
        <xsd:element name="footer" type="packetnode"/>
    </xsd:sequence>
    <xsd:attribute name="size" type="value16"/>
    <xsd:attribute name="stuffing" type="value8"/>
</xsd:complexType>
<xsd:complexType name="packetnode">
    <xsd:choice minOccurs="0" maxOccurs="unbounded">
        <xsd:element name="data8" type="data8"/>
        <xsd:element name="data16" type="data16"/>
        <xsd:element name="data32" type="data32"/>
        <xsd:element name="text" type="xsd:string"/>
        <xsd:element name="size8" type="size8"/>
        <xsd:element name="size16" type="size16"/>
        <xsd:element name="size32" type="size32"/>
        <xsd:element name="string255" type="string255"/>
        <xsd:element name="packet" type="packet"/>
        <xsd:element name="field8" type="field8"/>
        <xsd:element name="field16" type="field16"/>
        <xsd:element name="field32" type="field32"/>
        </xsd:choice>
</xsd:complexType>
<xsd:complexType name="payloadnode">
    <xsd:choice minOccurs="0" maxOccurs="unbounded">
        <xsd:element name="data8" type="data8"/>
        <xsd:element name="data16" type="data16"/>
        <xsd:element name="data32" type="data32"/>
        <xsd:element name="text" type="xsd:string"/>
        <xsd:element name="size8" type="size8"/>
        <xsd:element name="size16" type="size16"/>
        <xsd:element name="size32" type="size32"/>
        <xsd:element name="string255" type="string255"/>
        <xsd:element name="packet" type="packet"/>
        <xsd:element name="field8" type="field8"/>
        <xsd:element name="field16" type="field16"/>
        <xsd:element name="field32" type="field32"/>
<xsd:element name="atom" type="payloadnode"/>
        </xsd:choice>
</xsd:complexType>
<xsd:simpleType name="fieldtypes">
    <xsd:restriction base="xsd:anyType">
        <xsd:enumeration value="size"/>
        <xsd:enumeration value="currentpacket"/>
        <xsd:enumeration value="lastpacket"/>
    </xsd:restriction>
```

```
</xsd:simpleType>
<xsd:complexType name="field8">
   <xsd:complexContent>
      <xsd:restriction base="xsd:anyType">
         <xsd:attribute name="type" type="fieldtype"/>
         <xsd:attribute name="mask" type="value8"/>
         <xsd:attribute name="value" type="value8"/>
      </xsd:restriction>
   </xsd:complexContent>
</xsd:complexType>
<xsd:complexType name="field16">
   <xsd:complexContent>
      <xsd:restriction base="xsd:anyType">
         <xsd:attribute name="type" type="fieldtype"/>
         <xsd:attribute name="mask" type="value16"/>
         <xsd:attribute name="value" type="value16"/>
      </xsd:restriction>
   </xsd:complexContent>
</xsd:complexType>
<xsd:complexType name="field32">
   <xsd:complexContent>
      <xsd:restriction base="xsd:anyType">
         <xsd:attribute name="type" type="fieldtype"/>
         <xsd:attribute name="mask" type="value32"/>
         <xsd:attribute name="value" type="value32"/>
      </xsd:restriction>
   </xsd:complexContent>
</xsd:complexType>
<xsd:complexType name="data8">
   <xsd:simpleContent>
      <xsd:extension base="list8">
         <xsd:attribute name="value" type="list8"/>
      </xsd:extension>
   </xsd:simpleContent>
</xsd:complexType>
<xsd:complexType name="data16">
   <xsd:simpleContent>
      <xsd:extension base="data16">
         <xsd:attribute name="value" type="value16"/>
      </xsd:extension>
   </xsd:simpleContent>
</xsd:complexType>
<xsd:complexType name="data32">
   <xsd:simpleContent>
      <xsd:extension base="list32">
         <xsd:attribute name="value" type="list32"/>
      </xsd:extension>
   </xsd:simpleContent>
</xsd:complexType>
   <xsd:complexType name="string255">
      <xsd:simpleContent>
         <xsd:attribute name="value" type="char255"/>
      </xsd:simpleContent>
   </xsd:complexType>
</xsd:schema>
```

This is particularly advantageous due to its ability to represent the sizes of sections and the use of packets and atoms.

In relation to the above, an example of an intermediate XML types schema is as follows. This is a user data format definition and defines a user input XML file.

```
<?xml version="1.0" encoding="UTF-8"?>
<xsd:schema
xmlns:xsd="http://www.w3.org/2000/10/XMLSchema">
   <xsd:annotation>
      <xsd:documentation xml : lang="en">
```

XML Binary Description Types
Copyright 2000 Sony BPE. All rights reserved.

```
      </xsd:documentation>
   </xsd:annotation>
<xsd:simpleType name="int8">
   <xsd:restriction base="xsd:integer">
      <xsd:minInclusive value="0"/>
      <xsd:maxInclusive value="255"/>
   </xsd:restriction>
</xsd:simpleType>
<xsd:simpleType name="hex8">
   <xsd:restriction base="xsd:string">
      <xsd:pattern value="0x [a-f | 0-9] {2}"/>
   </xsd:restriction>
</xsd:simpleType>
<xsd:simpleType name="int8list">
   <xsd:list itemType="int8"/>
</xsd:simpleType>
<xsd:simpleType name="hex8list">
   <xsd:list itemType="hex8"/>
</xsd:simpleType>
<xsd:simpleType name="list8">
   <xsd:union memberTypes="hex8list int8list"/>
</xsd:simpleType>
<xsd:simpleType name="value8">
   <xsd union memberTypes="int8 hex8"/>
</xsd:simpleType>
<xsd:simpleType name="int16">
   xsd:restriction base="xsd:integer">
      <xsd:minInclusive value="0"/>
      <xsd:maxInclusive value="65535"/>
   </xsd:restriction>
</xsd:simpleType>
<xsd:simpleType name="hex16">
   <xsd:restriction base="xsd:string">
      <xsd:pattern value="0x [a-f | 0-9] {4}"/>
   </xsd:restriction>
</xsd:simpleType>
<xsd:simpleType name="int16list">
   <xsd:list itemType="int16"/>
</xsd:simpleType>
<xsd:simpleType name="hex16list">
   <xsd:list itemType="hex16"/>
</xsd:simpleType>
<xsd:simpleType name="value16list">
   <xsd:union memberTypes="hex16list int16list"/>
</xsd:simpleType>
<xsd:simpleType name="value16">
   <xsd:union memberTypes="hex16 int16"/>
</xsd:simpleType>
<xsd:simpleType name="int32">
   <xsd:restriction base="xsd:integer">
      <xsd:minInclusive value="0"/>
      <xsd:maxInclusive value="4294967295"/>
   </xsd:restriction>
</xsd:simpleType>
<xsd:simpleType name="hex32">
   <xsd:restriction base="xsd:string">
      <xsd:pattern value="0x [a-f | 0-9] {8}"/>
   </xsd:restriction>
</xsd:simpleType>
<xsd:simpleType name="int32list">
   <xsd:list itemType="int32"/>
</xsd:simpleType>
<xsd:simpleType name="hex32list">
   <xsd:list itemType="hex32"/>
</xsd:simpleType>
<xsd:simpleType name="value32list">
   <xsd:union memberTypes="value32list value32list"/>
</xsd:simpleType>
<xsd:simpleType name="value32">
   <xsd union memberTypes"int32 hex32"/>
```

-continued

```
</xsd:simpleType>
   <xsd:simpleType name="char255">
      <xsd:restriction base="xsd:string">
         <xsd:maxLength value='255'/>
      </xsd:restriction>
   </xsd:simpleType>
</xsd:schema>
```

According to the basic format, a single intermediate XML file can be used to generate multiple binary output files. The data for each is contained within the<file close>tag.

```
<?xml version="1.0" encoding="UTF-8"?>
<xbd xmlns:xsi="http://www.w3.org/2001/XMLSchema-instance"
     xsi : noNamespaceSchemaLocation"xbd.xsd">
   <file name="binary.dat">
      . . . .
      . . . .
   </file>
</xbd>
```

Thus, in the user XML, parts defined by <file . . . > and </file> can be separated into respective fragments. The fragments representing binary XML files can be selectively converted to respective binary data files. In other words, it is possible to convert selectively different parts of the user XML.

The most basic tags are the data X tags, namely data 8, data 16 and data 32 that express 8 bit, 16 bit and 32 bit values respectively. These provide a method of representing lists of values as either hexadecimal or decimal unsigned values.

```
<file name="binary.dat">
   <data8 value="0x08 0x10 0x1a"/>
   <data16 value="0x0011 0xa1ff"/>
   <data32 value="0xaabbccddee 0x0011223344"/>
   <data8> 0x11 0x23 0x89 0xaa </data8>
   <data16> 0x1ff2 0x5ab5 0x5679 0x99aa </dat16>
   <data8> 100 200 70 </data8>
</file>
Data Generated
08  10  1a  00  11  a1  ff  aa
bb  cc  dd  ee  00  11  22  33
44  64  c8  46
```

A text tag is provided which allows the binary formation of textual information. The individual characters are 8 bit encoded.

```
<text> this could be a textual message of any length
</text>
Data Generated
74  68  69  73  20  63  6f  75
6c  64  20  62  65  20  61  20
74  65  78  74  75  61  6c  20
6d  65  73  73  61  67  65  20
6f  66  20  61  6e  79  20  6c
65  6e  67  74  68
```

A string 255 tag is used. This tag provides a simple method of specifying a text string that is limited to 256 characters. The binary code generated generates an 8 bit value giving the size of the string.

```
<string255 value="this is a simple string">
Data Generated
0f  74  68  69  73  20  69  73
20  61  20  73  69  6d  70  6c
65  20  73  74  72  69  6e  67
```

It is functionality equivalent to using a size8 and text tag.

```
<size8>
   <text> this is equivalent to a string255
   </text>
</size8>
```

Size X tags are provided. The size X tags are used to generate a simple size field relating to the data enclosed. These tags can be embedded hierarchically.

```
<size8 mask="0xff" value="0x00">
   <data8 value="0x01"/>
</size8>
<size16 mask="0x0fff" value="0x1000">
   <data8 value="0x22"/>
   <size8 mask="0xff" value="0x00">
      <data8 value="0x11"/>
   </size8>
</size16>
Data Generated
01 01 10 03 22 01 11
```

The mask attribute is used to indicate the limits of size field. This value is ANDed with the calculated size. The value is then ANDed with the inverse of the mask and added:

SIZE (size & mask)+(! mask & value)

BitsetX tags are used. The bitsetX tags provide a method of expressing binary bitset data:

```
<bitset8>
   <bits mask="0xf0" value="0x10"/>
   <bits mask="0x0f" value="0x01"/>
</bitset8>
<bitset16>
   <bits mask="0xff00" value="0x0100"/>
   <bits mask="0x00f0" value="0x0020"/>
</bitset16>
Data Generated
11 01 20
```

The bitset value is generated using the following algorithm, where the:

BITSET=Σ (value & mask).

This feature could be extended by adding a bit shift feature.

The intermediate XML also provides a mechanism for packetizing blocks of binary data into limited fixed or variable length chunks. The packet grouping is used to denote the region of data to be generated as packets. This has header, payload and footer components. The payload data is broken into packets with the header and footer applied.

A packet tag is used to identify a list of data descriptions that are to be placed into packets of a certain maximum size. The size attribute denotes the maximum size of a packet if the stuffing attribute is not included. Packets will be packed with payload data as fully as possible according to atomicity, but packet sizes will be variable. If the stuffing attribute is included, the packets will be packed as fully as possible according to atomicity, but packet sizes will be constant and any remaining space will be filled with the stuffing value.

A packet has a header, payload and footer sub tags. Any of these may be empty. Packets will only be generated until the payload data is completely used.

Field X tags are provided and used to insert certain variables that are important in the construction of packetized data. The tag also provides an opportunity for extending the format at a later stage with minimum disruption.

The mask value is applied to the field value and then added to the additional value. This allows the specification of sub-field values.

FIELD=(field & mask)+(! mask & value)

The usage of particular values are:

Size: this specifies the size of non-null data in the packetized payload. The value field may be used to add the additional fixed offset generated by the header and footer blocks.

Current packet: specifies a numeric count that increments for each packet generated from the payload.

Last packet: specifies the number of packets constructed from the payload data.

The following shows an example of packetizing a typical private section.

Atom tags are used to wrap together a unit of data that cannot be spread between packets. The packet generation algorithm ensures that an atomic unit is placed completely within a single packet.

```
<packets size="100" stuffing="0xff">
    <header>
        <data8 value="0xaa"/>        <! -- table id -->
        <size16 mask="0x0fff" value="0x1000">
        <data16 value="0x1111"/>     <! -- extended table id -->
        <field16 type="size" mask="0xff" value="0x07"/>
        <bitset8>
            <bits mask="0x3e" value="0x10"> <! -- version -->
            <bits mask="0x01" value="0x01"> <! -- current -->
        </bitset8>
        <! -- section number -->
        <field8 type="currentpacket" mask="0xff" value="0x00"/>
        <! -- last section number -->
        <field8 type="lastpacket" mask="0xff" value="0x00"/>
    </header>
    <payload>
        <atom>
            <data8 value="0x00 0x00 0x00 0x00"/>
        </atom>
        <atom>
            <data8 value="0x00 0x00 0x00 0x00"/>
        </atom>
    </payload>
    <footer>
    </footer>
</packets>
```

As an application note, the packet instruction can be used in an MPEG/DVB sense for intra-table packing, for descriptors that may be large such as the extended event_descriptor:

```
<packets size="255">
    <header/>
    <payload>
        <atom><text>this is a test message</text></atom>
        <atom><text>this is a text message</text></atom>
        <atom><text>this is a text message</text></atom>
    </payload>
    <footer/>
</packets>
```

How errors are generated and logged is dependent on particular implementations. However, the following is an example of possible error codes.

| Code | Label | Description |
| --- | --- | --- |
| 10000 | SYNTAX | Syntax error not covered after schema validation |
| 10001 | FILECREATION | Unable to create file |
| 10002 | VALUERANGE | Value is out of range specified |
| 10003 | SIZEEXCEEDED | Value of size field exceeds size specified (i.e. > 256 bytes contained in a size8 node) |
| 10004 | VALUEEXCEEDED | Addition of the masked value exceeds the tag size limits |
| 10005 | BITSETEXCEEDED | Total bitset value exceeds the size specified |
| 10006 | FIELDEXCEEDED | Value of field variable exceeds size specified |
| 10007 | ATOMSIZE | Atom is too large to fit inside packet limits specified |

We claim:

1. An apparatus for providing binary digital TV data from a structured data format, the apparatus including:
   a convertor for converting data in a structured data format according to a predetermined intermediate data format definition into binary digital TV data in accordance with a predetermined technical standard;
   an output for outputting the binary digital TV data; and
   a processor for applying a conversion algorithm to a structured data format according to a user data format definition so as to convert the data in the structured data format according to the user data format definition to data in the structured data format according to said intermediate data format definition for conversion by said convertor.

2. An apparatus according to claim 1 further including:
   an intermediate memory for the data in the structured data format according to said intermediate data format definition wherein the data in the structured data format according to said intermediate data format definition may be input directly to said intermediate memory.

3. An apparatus according to claim 1 further including an algorithm memory for storing said conversion algorithm wherein said conversion algorithm may be replaced/edited according to descriptor tables for the predetermined technical standard.

4. An apparatus according to claim 1 further including:
   a user memory for storing the data in the structured data format according to the user data format definition.

5. An apparatus according to claim 4 wherein the processor allows creation by a user of data in the structured data format according to the user data format definition.

6. An apparatus according to claim 1 wherein the user data format definition may be replaced/edited according to descriptor tables for the predetermined technical standard.

7. An apparatus according to claim 1 further including a GUI by which operation of the processor may be controlled.

8. A method of providing binary digital TV data from a structured data format, the method including:
   providing an intermediate data format definition for structured data format representing digital TV data in accordance with a predetermined technical standard;
   providing a predetermined algorithm for converting data in the structured data format according to said intermediate data format definition into binary digital TV data of said predetermined technical standard; and
   providing a user data format definition and a conversion algorithm in accordance with descriptor tables for said predetermined technical standard such that features of the digital TV data defined in the structured data format according to said user data format definition are converted by said conversion algorithm into data in the structured data format according to said intermediate data format definition.

9. A method according to claim 8 further including:
   editing/replacing said user data format definition and said conversion algorithm according to the descriptor tables of said predetermined technical standard.

10. A method according to claim 8 wherein the digital TV data is non executable.

11. A method according to claim 8 wherein the digital TV data is service information.

12. A method according to claim 8 wherein the predetermined standard is MPEG-2.

13. A method according to claim 8 wherein the predetermined standard is one of DVB, ATSC and ARIB.

14. A method according to claim 8 wherein the intermediate data format definition defines a binary description format/language.

15. A method according to claim 8 wherein the structured data format is XML.

16. A method according to claim 8 wherein the conversion algorithm is embodied in XSL.

17. A method of describing binary digital TV data including:
   describing binary digital TV data in accordance with a predetermined technical standard with a structured data format according to an intermediate data format definition such that a predetermined algorithm may be used to convert data in the structured data format according to said intermediate data format definition into binary digital TV data of said predetermined technical standard, a user defining digital TV data with a structured data format according to a user data format definition, the user data format definition and a conversion algorithm for converting data in the structured data format according to the user data format definition into data in the structured data format according to said intermediate data format definition being defined according to descriptor tables of the predetermined technical standard.

18. An intermediate data format definition defining a structured data format for describing digital TV data in accordance with a predetermined standard such that a predetermined technical algorithm may be used to convert data in the structured data format according to said intermediate data format definition into binary digital TV data of said predetermined technical standard whereby user data format definitions and conversion algorithms may be devised according to descriptor tables for the predetermined technical standard, the user describing data with the structured data format according to a user data format definition and data in the structured data format according to the user data format definition being converted by the conversion algorithm to structured data format according to said intermediate data format definition.

19. A definition according to claim 18 wherein the digital TV data is non executable.

20. A definition according to claim 18 wherein the digital TV data is service information.

21. A definition according to claim 18 wherein the predetermined standard is MPEG-2.

22. A definition according to claim 18 wherein the predetermined standard is one of DVB, ATSC and ARIB.

23. A definition according to claim 18 wherein the intermediate data format definition defines a binary description format/language.

24. A definitions according to claim 18 wherein the structured data format is XML.

25. A definition according to claim 24 wherein the conversion algorithm is embodied in XSL.

26. A broadcast system including an apparatus for providing binary digital TV data from a structured data format, the apparatus including:
   a convertor for converting data in a structured data format according to a predetermined intermediate data format definition into binary digital TV data in accordance with a predetermined technical standard;
   an output for outputting the binary digital TV data; and
   a processor for applying a conversion algorithm to a structured data format according to a user data format definition so as to convert the data in the structured data format according to the user data format definition to data in the structured data format according to said intermediate data format definition for conversion by said convertor.

27. A broadcast system configured to conduct a method of providing binary digital TV data from a structured data format, the method including:
   providing an intermediate data format definition for structured data format representing digital TV data in accordance with a predetermined technical standard;
   providing a predetermined algorithm for converting data in the structured data format according to said intermediate data format definition into binary digital TV data of said predetermined technical standard; and
   providing a user data format definition and a conversion algorithm in accordance with descriptor tables for said predetermined technical standard such that features of the digital TV data defined in the structured data format according to said user data format definition are converted by said conversion algorithm into data in the structured data format according to said intermediate data format definition.

28. A computer readable storage medium having recorded thereon code components defining an intermediate data format definition intermediate data format definition defining a structured data format for describing digital TV data in accordance with a predetermined standard such that a predetermined technical algorithm may be used to convert data in the structured data format according to said intermediate data format definition into binary digital TV data of said predetermined technical standard whereby user data format definitions and conversion algorithms may be devised according to descriptor tables for the predetermined technical standard, the user describing data with the structured data format according to a user data format definition and data in the structured data format according to the user data format definition being converted by the conversion algorithm to structured data format according to said intermediate data format definition.

* * * * *